(12) United States Patent
Mazzenga et al.

(10) Patent No.: US 6,405,939 B1
(45) Date of Patent: Jun. 18, 2002

(54) VOICE-ACTIVATED SHOWER SYSTEM

(76) Inventors: Gino A. Mazzenga, 21 Spring Meadow Ct., Cranston, RI (US) 02921; Thomas B. Brundage, P.O. Box 418, Ottawa, KS (US) 66067

( * ) Notice: Subject to any disclaimer, the term of this patent is extended or adjusted under 35 U.S.C. 154(b) by 0 days.

(21) Appl. No.: 09/584,132

(22) Filed: May 31, 2000

(51) Int. Cl.$^7$ .............................................. B05B 12/00
(52) U.S. Cl. ......................... 239/69; 239/73; 239/71; 239/67; 4/625
(58) Field of Search ............................ 239/73, 71, 69, 239/67; 4/623, 605, 615

(56) References Cited

U.S. PATENT DOCUMENTS

| | | |
|---|---|---|
| 4,055,278 A | 10/1977 | Seymour |
| 4,121,773 A | 10/1978 | Headen et al. |
| 4,193,520 A | 3/1980 | Duffield |
| 4,218,013 A | 8/1980 | Davidson |
| 4,467,964 A | 8/1984 | Kaeser |
| 4,901,765 A | 2/1990 | Poe |
| 4,931,938 A | * 6/1990 | Hass ........................ 364/152 |
| 5,071,070 A | 12/1991 | Hardy |
| 5,274,858 A | 1/1994 | Berry |
| 5,853,130 A | * 12/1998 | Ellsworth ................. 239/69 X |
| 5,868,311 A | * 2/1999 | Cretu-Petra ............... 4/623 X |
| 5,957,379 A | 9/1999 | McMorrow et al. |
| 6,000,626 A | 12/1999 | Futo et al. |

FOREIGN PATENT DOCUMENTS

JP          4-109920      *   4/1992

* cited by examiner

*Primary Examiner*—Lesley D. Morris
(74) *Attorney, Agent, or Firm*—Dale J. Ream

(57) ABSTRACT

A voice-controlled shower system for use with a conventional shower assembly includes sources of hot and cold water, a showerhead, and a conduit for delivering water from the water sources to the showerhead. Each water source includes a control valve coupled to a control unit. The control unit is adapted to store electric impulses representative of a predetermined vocabulary of voice commands. The shower system further includes a receiver for receiving a speech input from a user and delivering corresponding electric impulses to the control unit. The electric impulses of the speech input are compared by the control unit to the electric impulses of the vocabulary of voice commands, the control unit actuating predetermined control valves upon recognizing a match so as to start or stop the water flow from the water sources to the showerhead or to adjust the water temperature. The shower system may also include a plurality of liquid containers, each container including a tube member with a control valve for selectably communicating a respective liquid with the water conduit. A respective container control valve is actuated upon a recognition of a speech input as matching an appropriate command of said vocabulary of voice commands.

7 Claims, 4 Drawing Sheets

VOICE-ACTIVATED SHOWER SYSTEM

BACKGROUND OF THE INVENTION

This invention relates generally to devices and methods for selectively dispensing liquids into the water stream of a shower and, more particularly, to a shower system in which water flow, water temperature, and liquid dispensing is completely controlled through the recognition of a user's voice commands.

Various devices have been proposed for selectively dispensing soap, shampoo, body lotion, etc. into the water stream of an otherwise conventional shower as a matter of convenience. While assumably effective for their intended purposes, the existing devices still require the manual actuation of knobs, levers, or switches to control these shower functions. Such manual manipulation of shower control fixtures, however, is very difficult for elderly or disabled persons having decreased dexterity or mobility. The risk of falling in a slippery shower also counsels against additional manipulation of controls.

Therefore, it is desirable to have a shower system which is voice-activated and voice controlled. Further, it is desirable to have a shower system in which water flow, water temperature, and the dispensing of selected liquids into the water stream is controlled through the recognition of a user's voice commands. In addition, it is desirable to have a shower system in which the selected liquid containers and a control unit are easily accessible by a user.

SUMMARY OF THE INVENTION

A voice-controlled shower system according to a preferred embodiment of the present invention for use with a conventional shower assembly includes a conduit for connecting hot and cold water sources with a showerhead. Each junction between a water source and the conduit includes a control valve. A housing adapted to be mounted within a wall of the shower assembly defines an interior space for holding a control unit. The control unit is electrically connected to each of the water source control valves and is also adapted to store a plurality of electric impulses representative of a predetermined vocabulary of voice commands. The preferred vocabulary of voice commands includes "on", "off", "hotter", "colder", "shampoo", "soap", and "rinse" although other equivalent, or even additional, terms or phrases may also be used. A receiver is mounted to a wall of the shower assembly and is coupled to the control unit for receiving a speech input from a user and delivering it to the control unit. A predetermined action is associated with each of the vocabulary commands; namely, the control unit delivers a signal energizing one or more control valves to open or close, partially or completely, upon recognition of a speech input by a user as matching one of the vocabulary of voice commands.

The voice-controlled shower system further includes a plurality of liquid containers positioned within the interior space of the housing, each container having a tube extending therein and being coupled to the main water stream conduit. Each tube includes a control valve electrically connected to the control unit and is selectively opened when the control unit recognizes a speech input as matching a predetermined command of the vocabulary of voice commands. Therefore, liquids such as soap, shampoo, lotion, etc. may be dispensed into the main water stream upon audible command.

Therefore, a general object of this invention is to provide a shower system that is completely controlled by the voice commands of a user.

Another object of this invention is to provide a shower system, as aforesaid, which is convenient to use by elderly or disabled persons or other persons having dexterity or mobility impairments.

Still another object of this invention is to provide a shower system, as aforesaid, in which a plurality of liquids may be selectively dispensed into the water stream.

Yet another object of this invention is to provide a shower system, as aforesaid, which does not include selector valves, knobs, handles, or levers to control shower functions.

A further object of this invention is to provide a shower system, as aforesaid, having a control unit for comparing a speech input of a user with a predetermined vocabulary of voice commands.

A still further object of this invention is to provide a shower system, as aforesaid, in which the temperature of the water stream flowing through the showerhead may be adjusted by user issuance of an appropriate voice command.

Another object of this invention is to provide a shower system, as aforesaid, which conserves water by eliminating the need for manual application of soap, shampoo, lotion, or other liquids.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
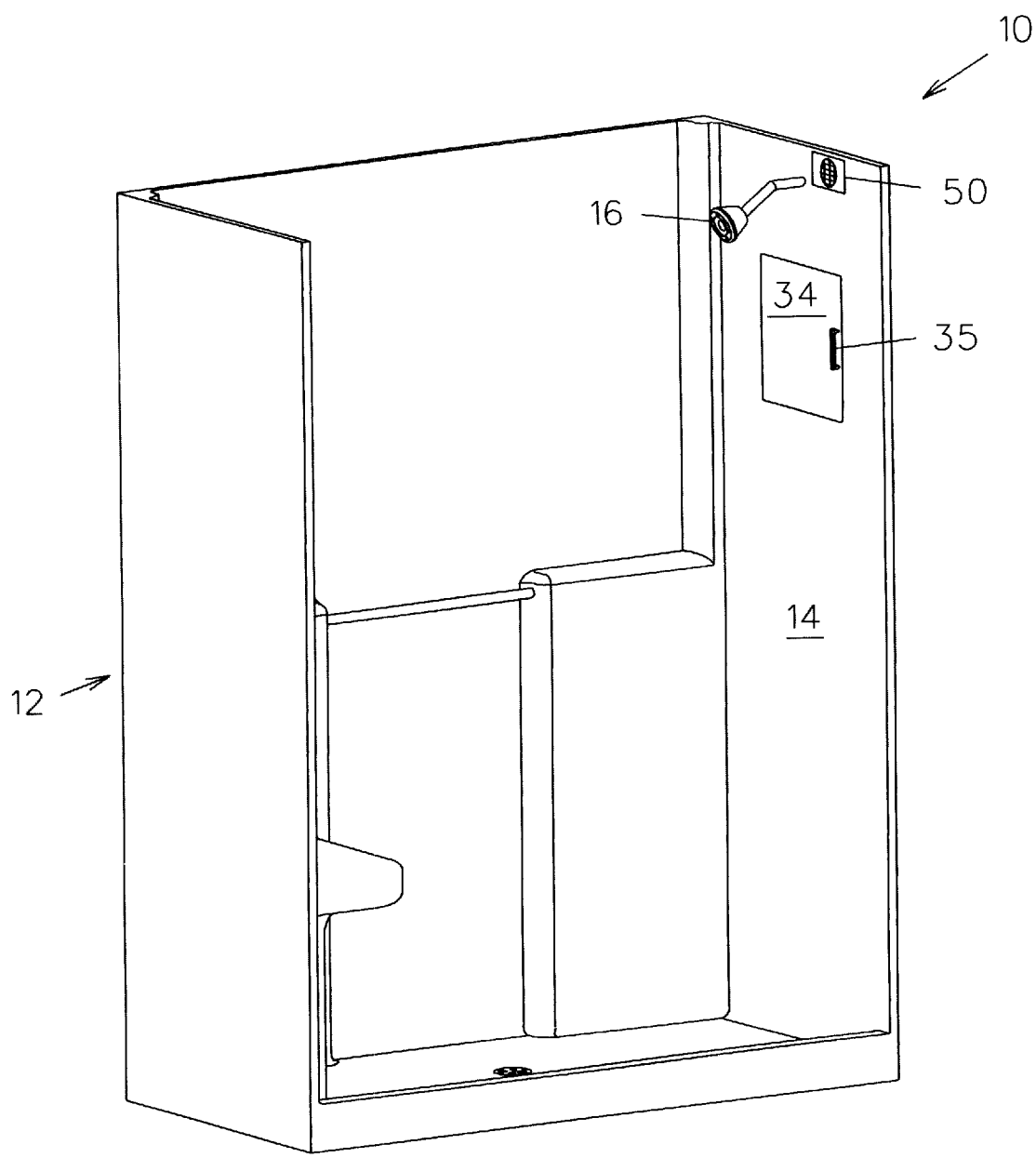
FIG. 1 is a perspective view of the preferred embodiment of the voice-controlled shower system in use with a conventional shower assembly.
Figure 2:
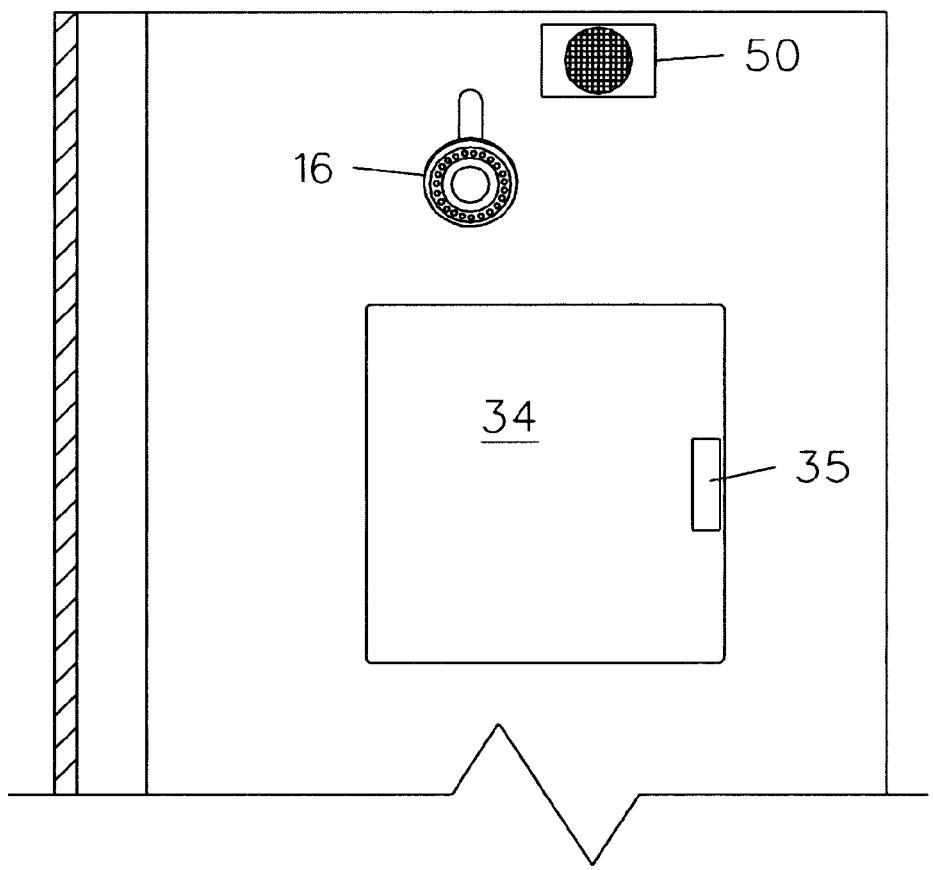
FIG. 2 is an isolated view on an enlarged scale of the receiver and access door of the shower system as in FIG. 1.

A voice-controlled shower system 10 according to the preferred embodiment of this invention will now be described with reference to FIGS. 1–4 of the accompanying drawings. The shower system 10 includes a shower assembly 12 such as that shown in FIG. 1 which is conventional except that no temperature control knobs are present. In addition, the shower assembly 12 includes no base track for sliding doors but rather is configured to have swinging doors. It is understood, however, that the system may be installed in a conventional shower/bathtub having temperature control knobs. The shower system includes a main conduit 28 for delivering a water stream from hot and cold water lines 20, 24 to a showerhead 16, the showerhead defining an outlet. Each of the water lines 20, 24 includes a control valve 22, 26, respectively, for regulating the flow of water to the conduit 28, as to be further described below.

The shower system 10 includes a box-like housing 32 mounted to the back surface of a front wall 14 of the shower assembly 12 and includes an access door 34 pivotally attached thereto. The access door 34 may be pivotally opened into the user area of the shower assembly 12 through an opening in the front wall 14 thereof by a user pulling on the door handle 35. The housing 32 is mounted intermediate the water source lines 20, 24 and the showerhead 16 with the water stream conduit 28 extending through top and bottom walls and interior space thereof.

Figure 3:
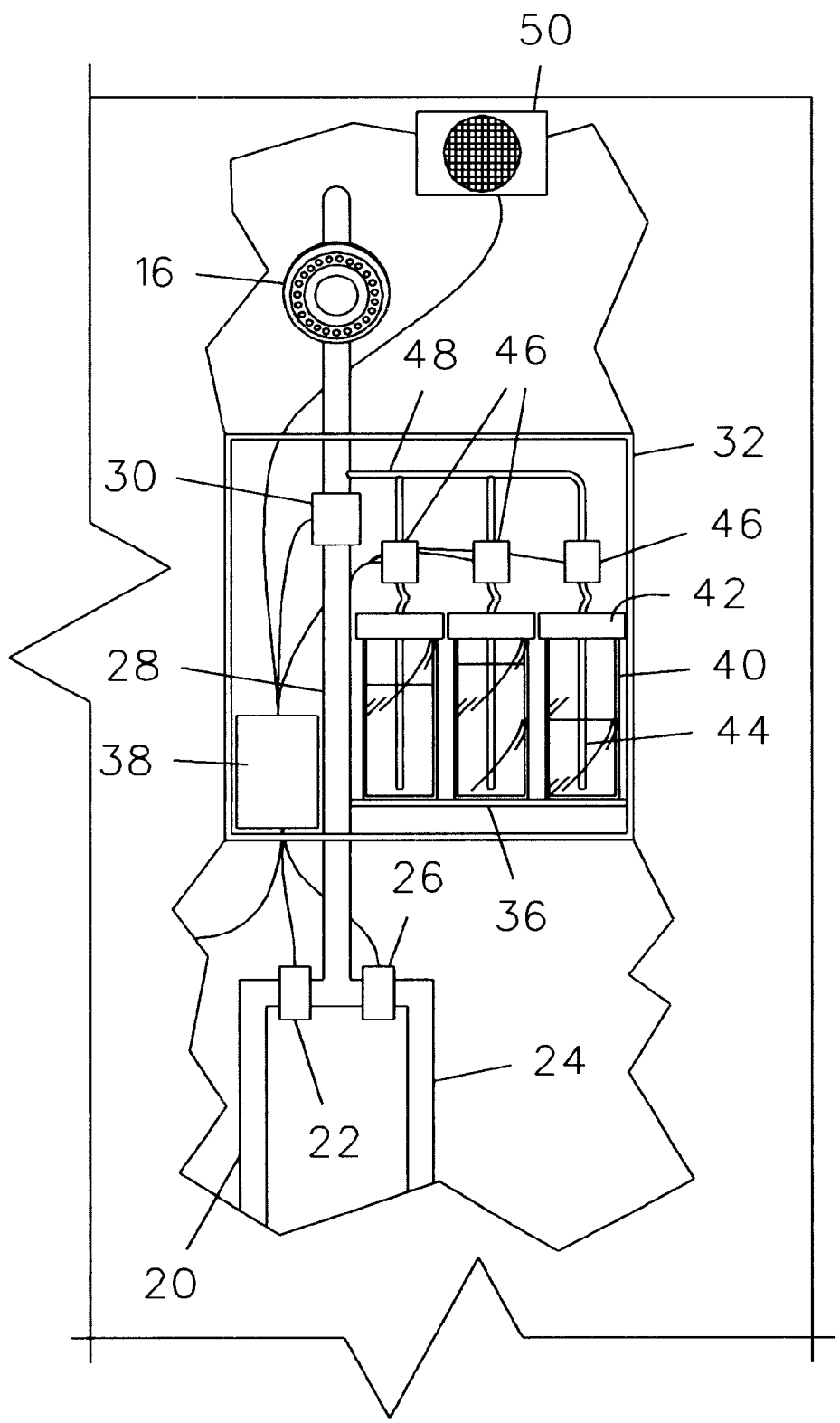
FIG. 3 is a front view as in FIG. 2 with the access door removed and portions of the shower assembly wall broken away.
Figure 4:
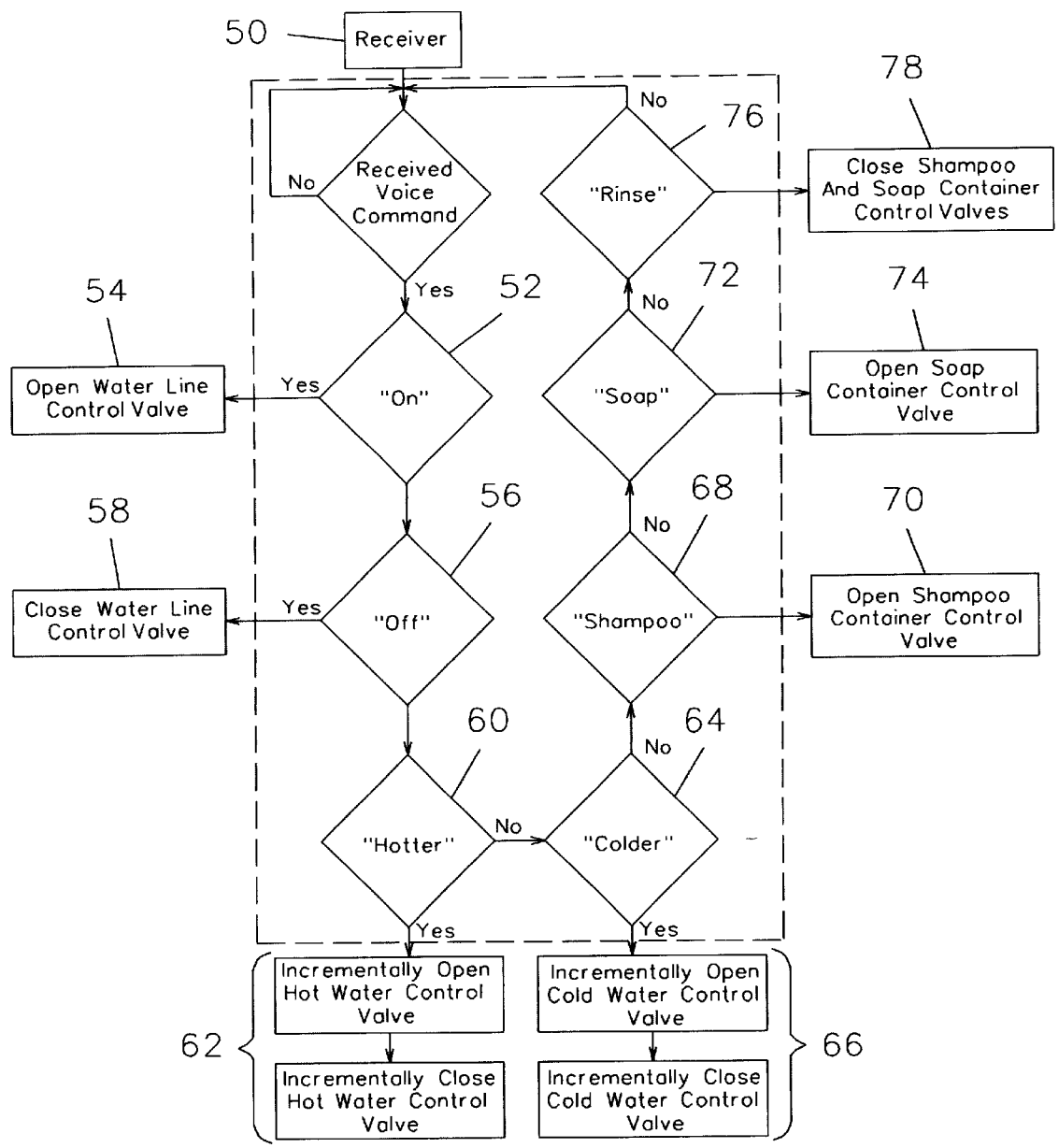
FIG. 4 is a flow chart illustrating the logic of the control unit in analyzing a speech input of a user.

A control unit 38 is mounted within the housing 32 and includes a memory for storing electric impulses representative of a predetermined vocabulary of voice commands. An action is associated with each voice command (FIG. 3). The control unit 38 includes a memory component capable of storing electric impulses representing a predetermined set or vocabulary of voice commands. This set of voice commands is initially stored in memory by a user repeatedly speaking a command into a microphone that is interfaced with the control unit 38. The control unit 38 then analyzes the chosen voice commands according to a plurality of vocal characteristics, converts the spoken commands into corresponding electric impulses, and then stores the impulses in memory. These signals represent characteristics such as duration, frequency, loudness, pitch, etc. The algorithms for establishing a database of computer recognizable words relative to a single user or even multiple users are known in the art of voice recognition software.

A plurality of liquid containers 40 are supported on a platform 36 within the interior space of the housing 32 (FIG. 3). Each container 40 includes a cylindrical body with a closed bottom and open top. A threaded cap 42 is screwably attached to each container 40 so as to cover each open top. Therefore, a respective cap 42 is removable whenever a container needs to be refilled with a respective liquid, such as soap, shampoo, lotion, etc. A tube member 44 extends through each cap 42 and includes a first open end adjacent the bottom wall therein. A second end of each tube member 44 is coupled with an intermediate siphon tube 48 which, in turn, is coupled to the main conduit 28. Each tube member 44 further includes a control valve 46 intermediate a respective container 40 and the siphon tube 48. A liquid from a selected container 40 is drawn or siphoned therefrom when water is flowing through the main conduit 28 and a respective control valve 46 relative to a selected container 40 is at least partially open. The liquid is siphoned as a result of the decrease in atmospheric pressure created by the flow of water through the conduit 28, the siphon rate being dependent upon the velocity of the flow rate. A flow rate sensor (not shown) may be included to more accurately regulate the siphon rate of liquids in the containers 40. Each of the tube member control valves 46 is electrically connected to the control unit 38 and are responsive thereto as to be more fully described below.

The shower system 10 further includes a receiver 50 mounted on the front wall 14 of the shower assembly 12, although any placement on the walls of the shower assembly 12 would be suitable. The receiver 50 includes a microphone for receiving a speech input from a user and includes circuitry for converting the speech input into an electrical signal or impulses representative of the speech input. The receiver 50 is electrically connected to the control unit 38 for delivering the converted speech input thereto. It is understood, however, that the receiver may be coupled to a transmitter for transmitting the converted speech input through the air as a radio wave or other suitable signal type to another receiver coupled to the control unit 38.

Once received by the control unit 38, the control unit sequentially compares the electrical impulses representative of the speech input with the electric impulses representative of each command of the vocabulary of voice commands stored in memory. According to the logic of FIG. 3, when the speech input matches a command in the vocabulary of voice commands, the control unit 38 initiates a corresponding action. For example, if the speech input matches the voice command "On" 52, then the control unit 38 sends a signal to the control valves 22, 26 coupled to the hot and cold water lines 20, 24, respectively, to open a predetermined amount so as to establish a predetermined initial water velocity and temperature, as indicated by block 54. Or, if the speech input matches the voice command "Off" 56, the control unit 38 sends a signal to the water source control valves 22, 26 to close completely, as in block 58. Signals to incrementally open or close the water source control valves 22, 26 are sent 62, 66 when the speech input is "Hotter" 60 or "Colder" 64, respectively. Signals are sent 70, 74 to partially open the appropriate control valves 46 relative to respective liquid containers 40 when the speech input is "Shampoo" 68 and Soap" 72, respectively. If this same speech input is repeated, the respective valve is open further. Signals to close the control valves 22, 26 relative to the liquid containers 40 are sent 78 when the speech input is "Rinse". It is understood that other commands may be stored in the control unit 38 and the control unit 38 may be programmed to energize particular control valves to open or close upon a corresponding recognition of a respective command.

A control valve 30 may also be coupled to the main water stream conduit 28 and energized by the control unit 38 to close when the speech input is "off" and then to open if the next speech input is "on". In this case, the water stream may be temporarily suspended without energizing the control valves 22, 26 coupled to the water lines 20, 24. However, the water line control valves may also be closed if the suspension is longer than a predetermined time.

In use, a predetermined vocabulary of voice commands is initially programmed into the memory component of the control unit 38. The user or users will repetitively speak the voice commands included in a predetermined vocabulary such that the voice recognition algorithm can analyze and establish the electric impulses which will later be compared to speech input. Thereafter, a speech input of a user is received by the receiver, converted to electric impulses representative of the audible speech input, and delivered to the control unit for processing. The control unit 38 compares the electric impulses representative of the speech input to the electric impulses representative of each command of the vocabulary of voice commands. Upon recognition of a match between the speech input and one of the predetermined voice commands, the control unit initiates a signal to energize a predetermined control valve to completely or partially open or close. The speech recognition and action routine is repeated upon each new speech input received by the receiver.

Accordingly, it can be seen that the voice-controlled shower system 10 allows a user to undertake all of the functions of a showering procedure without manually manipulating any apparatus or fixtures.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A voice-controlled shower system, comprising:
   a source of hot water having a first control valve coupled thereto;
   a source of cold water having a second control valve coupled thereto;

a showerhead presenting an outlet;

a conduit for delivering water from said water sources to said showerhead, said conduit having a fourth control valve coupled thereto;

a plurality of liquid containers, each container including a tube member in communication with a liquid in said container, each tube member coupled to said conduit and having a respective third control valve for selectable liquid flow between a respective container and said conduit;

a control unit electrically connected to said first, second, and third control valves, said control unit adapted to store electric impulses representative of a predetermined vocabulary of voice commands;

a receiver connected to said control unit and adapted to receive an audible command from a user;

means for converting said audible command into electric impulses representing said audible command and delivering said electric impulses to said control unit;

first means in said control unit for comparing said received electric impulses of said audible command with said electric impulses of said vocabulary of voice commands, said control unit adapted to actuate said fourth valve to close while leaving said first and second valves open upon recognition of said audible command as matching a respective voice command of said vocabulary of voice commands, whereby water from said water sources is delivered to said showerhead at a previously determined temperature when said fourth control valve is reopened upon recognition of a subsequent audible command within a predetermined amount of time; and second means in said control unit for comparing said electric impulses of said audible command with said electric impulses of said vocabulary of voice commands, said control unit adapted to actuate a respective one of said first, second, third, and fourth control valves to open or close upon recognition of said audible command as matching a corresponding voice command of said vocabulary of voice commands, said control unit including means for closing said first and second control valves when said fourth control valve is closed upon recognition of said audible command and not reopened upon recognition of a subsequent audible command within a predetermined amount of time.

2. A shower system as in claim 1 further comprising means for drawing a liquid from a selected liquid container through a corresponding tube member by the negative pressure within said conduit when water is flowing therethrough.

3. A shower system as in claim 1 further comprising a housing disposed between said water sources and said showerhead, said housing adapted to support said control unit and said containers within an interior space defined thereby and having a door pivotally attached thereto for selectively providing access to said control unit and said containers.

4. A shower system as in claim 1 wherein each of said containers includes a cap removably coupled to an open top thereof, whereby each of said containers is refillable.

5. A shower system as in claim 1 wherein said receiver includes a microphone.

6. A shower system as in claim 1 wherein said means for delivering said electric impulses representing said audible command to said control unit includes a transmitter adapted to transmit electric impulses; and wherein said control unit is coupled to a second receiver for receiving said transmitted electric impulses representing said audible command.

7. A voice-controlled shower system, comprising:

a source of hot water having a first control valve coupled thereto;

a source of cold water having a second control valve coupled thereto;

a showerhead presenting an outlet;

a conduit for delivering water from said water sources to said showerhead, said conduit having a fourth control valve coupled thereto;

a plurality of liquid containers, each container including a tube member in communication with a liquid in said container, each tube member coupled to said conduit and having a respective third control valve for selectable liquid flow between a respective container and said conduit;

a control unit electrically connected to said first, second, and third control valves, said control unit adapted to store electric impulses representative of a predetermined vocabulary of voice commands;

a first receiver and adapted to receive an audible command from a user;

means for converting said audible command into electric impulses representing said audible command and delivering said electric impulses to said control unit, said means for delivering said electric impulses including a transmitter adapted to transmit said electric impulses;

a second receiver electrically connected to said control unit and adapted to receive said transmitted electric impulses from said transmitter;

first means in said control unit for comparing said received electric impulses of said audible command with said electric impulses of said vocabulary of voice commands, said control unit adapted to actuate said fourth valve to close while leaving said first and second valves open upon recognition of said audible command as matching a respective voice command of said vocabulary of voice commands, whereby water from said water sources is delivered to said showerhead at a previously determined water temperature when said fourth control valve is reopened upon recognition of a subsequent audible command within a predetermined amount of time; and second means in said control unit for comparing said received electric impulses of said audible command with said electric impulses of said vocabulary of voice commands, said control unit adapted to actuate a respective one of said first, second, third, and fourth control valves to open or close upon recognition of said audible command as matching a corresponding voice command of said vocabulary of voice commands, said control unit including means for closing said first and second control valves when said fourth control valve is closed upon recognition of said audible command and not reopened upon recognition of a subsequent audible command within a predetermined amount of time.

* * * * *